United States Patent Office 2,908,714
Patented Oct. 13, 1959

2,908,714

PROCESS FOR THE PREPARATION OF A DIAMINE

Anthony Charles Shabica, Livingston, N.J., assignor to Ciba Pharmaceutical Products, Inc., Summit, N.J., a corporation of New Jersey No Drawing. Application September 20, 1956
Serial No. 610,900

3 Claims. (Cl. 260—583)

This invention relates to a method for preparing the unsymmetrical N,N-dimethyl-ethylenediamine.

N,N-dimethyl-ethylenediamine has long been known as a useful intermediate for the preparation of a wide variety of chemical compounds. Together with various other ethylenediamines it has been useful as starting material for the preparation of spasmolytics, antihistaminics, and antimalarials in the pharmaceutical field. In this connection, N,N-dimethyl-ethylenediamine has been particularly advantageous.

Contrary to its wide use in various chemical fields no satisfactory, inexpensive and technically applicable method has been worked out for the preparation of N,N-dimethylethylenediamine. The known methods are deficient with respect to various features, e.g. expensive intermediates have to be used, the process has to be performed under pressure, high temperatures, or solvents not suitable in large amounts, such as ethereal solvents, have to be employed, etc.

Thus, the treatment of the $\beta$-amino-ethyl sulfuric acid half ester with dimethylamine according to German Patent 744,996, issued February 22, 1944, requires high temperatures and has to be performed under pressure. Turner, J. Am. Chem. Soc., vol. 68, p. 1607 (1946), gives a summary of the procedures used up to that date. Thus, by treatment of the N-($\beta$-bromoethyl)-phthalimide with dimethylamine and subsequent hydrolysis the N,N-dimethyl-ethylenediamine can be obtained by using expensive intermediates. The replacement of the bromine atom by an amino group in N,N-dialkyl-aminoethyl-bromide salts upon reaction with ammonia fails to give satisfactory results with the corresponding N,N-dimethyl derivative (Amundsen et al., J. Am. Chem. Soc., vol. 63, p. 305 (1941). Furthermore, the reduction of the N,N-dimethylamino-acetonitrile to the diamine by hydrogen in statu nascendi, e.g. sodium in ethanol, proceeds only in very small yields. Turner himself describes as a new method the hydrogenation of the above-mentioned acetonitrile by using catalytically activated hydrogen under pressure, by which the desired ethylenediamine is obtained in 47 percent yield together with a large amount of the bi-product, bis-(N,N-dimethylaminoethyl)-amine. Such a reduction requires specialized apparatus for high pressure hydrogenation and has to be performed in the presence of an expensive noble metal catalyst or Raney nickel, the latter being difficult to prepare in reproducible manner from batch to batch, leading to inferior and unpredictable yields.

A more recently reported procedure (Campaigne et al., El Cristol, vol. 7, p. 19 (1953), ref. Chem. Abstr., vol. 48, p. 11321 (1954)), giving the N,N-dimethyl-ethylenediamine in a 69 percent yield consists in reducing N,N-dimethyl-acetonitrile with lithium aluminum hydride in ether, which reduction requires an expensive reducing agent and has to be performed in the presence of an ether solvent, such as diethylether, not suitable for handling in large amounts.

I have now discovered a method for preparing pure N,N-dimethyl-ethylenediamine which is not only simple and economical but also leads in high yields to the final product. The method of this invention consists in reacting a primary $\beta$-halogeno-ethylamine or a salt thereof with an aqueous solution of dimethylamine.

This process is especially suited for the manufacture of N,N-dimethyl-ethylenediamine on a large scale, since it not only gives the best yields of any of the processes so far devised, but can also be performed without using any special apparatus such as pressure vessels, expensive starting materials, difficultly reproducible catalysts or inflammable solvents and without applying high temperatures or pressure. Furthermore, no by-products, such as the secondary bis-(N,N-dimethylaminoethyl)-amine, are formed; the N,N-dimethyl-ethylenediamine is obtained in a pure state.

A specific embodiment of my process is to react a $\beta$-halogeno-ethylamine, in the form of an acid addition, salt, with an aqueous solution of dimethylamine in the presence of an acid binding agent, which may be an excess of dimethylamine, or preferably an inorganic base or an inorganic carbonate. Because of its reactivity, $\beta$-chlorethylamine is preferred since it gives the highest yields, although other $\beta$-halogeno-ethylamines such as the $\beta$-bromo-ethylamine may be used too. Moreover, the $\beta$-chlorethylamine is a very inexpensive starting material. Suitable salts of $\beta$-halogeno-ethylamines are more especially those with hydrohalic acids, e.g. hydrogen chloride or hydrogen bromide, or with sulfuric acid. The dimethylamine is used in commercially available aqueous solutions.

When dimethylamine is used as the acid binding agent, this is effected by employing an excess amount in order to neutralize the generated acid. Higher yields are obtained if an inorganic base is added during the reaction; moreover, the amount of dimethylamine can be reduced considerably. Inorganic bases which can be used as acid binding agents are, for example, alkali or alkaline earth metal hydroxides, such as calcium hydroxide and especially potassium hydroxide or sodium hydroxide. Inorganic carbonates are especially alkali or alkaline earth metal carbonates, such as sodium, potassium or calcium carbonate. Some caution is required in keeping the temperature of the reaction material sufficiently low to prevent the loss of reactants, and cooling is required if the temperature rises above about 50° C. Although the reaction may be carried out at temperatures ranging from about 0° C. to about 50° C., the preferred range lies between 20° C. and 40° C.

This application is a continuation-in-part of my application Serial No. 539,660, filed October 10, 1955, now abandoned.

The following examples are intended to illustrate the claimed invention. The temperatures are given in degrees centigrade.

*Example 1*

A 40 percent commercial, aqueous dimethylamine solution, containing 360 g. of pure dimethylamine is stirred and cooled (in an ice bath) to 20°. 232 g. of $\beta$-chlorethylamine hydrochloride are added over a period of about ½ hour while stirring and maintaining the cooling. After the addition is completed, the solution is allowed to warm while stirring. When the temperature reaches 37°, cooling is continued until the temperature falls to 31° at which time the cooling bath is again removed. The temperature is allowed to rise slowly to about 38° and then by cooling is again reduced to 30°. The temperature now slowly falls when the bath is removed. The solution is then stirred and heated to 62–65° for about three hours. The solution, while stirring and cooling to 20–30° is treated with 430 g. of sodium hydroxide over a period of about ½ hour, stirred for about another ½ hour and then left standing at room temperature overnight. The upper layer is separated from the resulting mixture and combined with the approximately 10–15 percent additional amine layer obtained on filtering the emulsion through a 50 g. pad of purified siliceous earth using a rayon filter paper. The total amine layer is dried by stirring with 85 g. of sodium hydroxide for several hours at room temperature. The almost dry amine layer is separated and dried with another 20 g. of sodium hydroxide. The dry, crude diamine, contaminated with dimethylamine, is filtered, stripped of dimethylamine, and distilled to give 131.3 g. (75 percent of theory) N,N-dimethyl-ethylenediamine;

$$n_D^{15°} = 1.4300$$

purity by titration: 97 percent.

Example 2

Into a 3-neck, round-bottomed flask fitted with a thermometer, mechanical stirrer and reflux condenser are charged 450 g. of an aqueous commercial solution of dimethylamine (40 percent containing 180 g. of pure dimethylamine) and 270 ml. of water. 232 g. of chloroethylamine hydrochloride is then added over about one hour while stirring holding the reaction temperature at 25–30° by regulating the rate of addition and by occasional cooling with an ice bath. 80 g. of sodium hydroxide are added portion-wise at the same temperature and stirring is continued for about two hours with occasional ice bath cooling to hold the temperature at about 30°, until the spontaneous heat evolution has ceased. The mixture is then heated with continued stirring for two hours at 55–60°.

The mixture is treated with 350 g. of sodium hydroxide while cooling with an ice bath; considerable dimethylamine is evolved. The flask is connected to a distillation apparatus and heating is begun. About one hour is required to strip the excess dimethylamine which can be recovered by trapping the vapors in water. The external temperature is brought to about 114°, the vapor temperature to 99°, and distillation is continued, whereby the following fractions are collected:

| Fraction No. | Weight (g.) | Boiling Range (° C.) | Percent Diamine (titration) |
|---|---|---|---|
| 1 | 169 | 99–101 | 79.4 |
| 2 | 35.7 | 102 | 59.5 |
| 3 | 35.5 | 102–104 | 5.3 |

At this point the total yield of N,N-dimethyl-ethylenediamine by titration is 158.3 g. and the water content of the total distillation is 85.9 g. The total distillate is stirred for twenty minutes with 100 g. of sodium hydroxide which dissolves in the water forming a lower layer. The upper amine layer is separated and distilled through a 16-inch indented column over 15 g. of sodium hydroxide. The lower aqueous layer is discarded. The product is collected over the boiling range 105–110° and has a faint, yellowish cast. Yield 151.4 g. of N,N-dimethyl-ethylenediamine (86 percent of theory, based on chlorethylamine hydrochloride); $n_D^{25°} = 1.4253$; purity by titration: 97.9 percent.

What is claimed is:

1. A process for preparing N,N-dimethyl-ethylenediamine which comprises contacting a member of the group consisting of a β-halogenoethylamine and an acid addition salt thereof with an aqueous solution of dimethylamine in the presence of an acid binding reagent and at reaction temperatures ranging from about 0° C. to 50° C.

2. A process according to claim 1, wherein the reaction is carried out in the presence of sodium hydroxide.

3. A process for preparing N,N-dimethyl-ethylenediamine which comprises reacting β-chloroethylamine hydrochloride with an aqueous solution of dimethylamine in the presence of sodium hydroxide at a reaction temperature ranging from about 20° C. to 40° C.

References Cited in the file of this patent

UNITED STATES PATENTS

| 2,121,509 | Pyman et al. | June 21, 1938 |
| 2,364,178 | Wilson | Dec. 5, 1944 |

FOREIGN PATENTS

| 547,987 | Germany | Apr. 1, 1932 |